106. COMPOSITIONS, COATING OR PLASTIC

No. 502,097

UNITED STATES PATENT OFFICE.

THOMAS J. HELLER, OF EASTON, PENNSYLVANIA.

PLASTER COMPOSITION.

SPECIFICATION forming part of Letters Patent No. 502,097, dated July 25, 1893.

Application filed April 7, 1893. Serial No. 469,468. (No specimens.)

*To all whom it may concern:*

Be it known that I, THOMAS J. HELLER, a citizen of the United States, residing at Easton, in the county of Northampton and State of Pennsylvania, have invented certain new and useful Improvements in Plaster Compositions, of which the following is a specification.

My invention has relation to plaster compositions.

The principal objects of my invention are first, to provide a comparatively inexpensive plaster composition having great tenacity, durability, strength and adhesiveness; and second, to provide a plaster composition adapted to readily or rapidly harden or set in its application to walls and other structures.

My invention consists of a plaster composition that readily or rapidly hardens or sets in application to walls and other structures.

My invention further consists of a plaster composition, composed of a clay, mortar, plaster of paris or cement and a compound or mixture consisting of silicate and carbonate of soda, alum, sugar, gum, salt-cake and ground china-ware adapted to cause the ready or rapid retarding or hardening and setting of the composition in its application to walls and other structures.

The plaster or cement composition of the present invention is adapted for rough or base coats applied to walls or white or finishing coats in application to walls or other similar structures.

In making this plaster composition for rough or base coats, I take about two and one-half ounces of silicate of soda and of carbonate of soda, two and one-half ounces of alum, two and one-half ounces of sugar, three and one-half ounces of senegal gum, two and one-fourth ounces of salt-cake and one to two pounds of ground china-ware more or less, and these materials are mixed together in a suitable quantity of water, it being understood that the relative proportions of the different materials mentioned may be increased or diminished as requirement may demand without injuriously affecting the composition. To every twenty pounds of the combined mass or mixture with a certain number of parts of water are added one hundred pounds of clay, one hundred pounds of plaster of paris, one hundred pounds of preferably Portland cement and sixteen hundred and eighty pounds of sand. For the white or finishing coat, twenty pounds more or less of the compound consisting of the materials mentioned or some of them, are mixed with one hundred pounds of kaolin, instead of the ordinary clay, six hundred and eighty pounds of plaster of paris more or less, and twelve hundred pounds of sand, omitting the cement as an element of the plaster composition.

When either of the base or body materials above mentioned for the white coat or the brown coat is used, the same action takes place as already described, and the composition is hard, tenacious, durable and strong and is not affected by either heat or moisture and at the same time is easily and rapidly worked under the trowel and capable of taking on a high polish.

The different elements of the composition mentioned impart desirable properties or qualities thereto. For example, the ground china-ware acts to harden the plaster and the gum as a restrainer and also assists in cementing the mass or mixture together. The sugar to a certain degree serves in the compound a like property thereto, but in combination with lime forms a chemical union which tends to increase the hardness or tenacity of the plaster composition in its application to structures. The alum, chemically speaking, is a combination of the base alumina and sulphuric acid and the salt-cake, a by-product of the manufacture of nitric acid and consists of sulphate and bisulphate of soda. Both the alum and the salt-cake are soluble sulphates, and when brought into contact with the lime in solution, an insoluble sulphate of calcium, or plaster of paris is formed, as well as aluminates, all of which tend to increase the effectiveness of this compound in conjunction with its use in a plastering substance. Sodium silicate, soluble glass or water glass is also a valuable ingredient of the compound, giving up its silicic acid, when combined as explained to form insoluble silicates, or an artificial stone. In practice it has been found that the addition of carbonate of soda to the mixture greatly enhances the product which is due to the fact that calcium carbonate or lime-stone is obtained.

This compound may be made in either a dry or wet state, but preferably in the former state for admixture with mortar, plastering or cementing compositions and in its use in such compositions the same are adapted to be readily applied to walls and other structures.

This composition is tenacious, hard, durable and strong and is little affected by either heat or moisture; and moreover, is readily and rapidly worked.

Having thus described the nature and objects of my invention, what I claim as new, and desire to secure by Letters Patent, is—

1. A plaster composition composed of a body material, silicate and carbonate of soda, alum, sugar, gum, salt-cake and ground inert material, substantially as and for the purposes set forth.

2. A plaster composition composed of clay, silicate and carbonate of soda, alum, sugar, senegal-gum, salt-cake and ground chinaware, substantially as and for the purposes set forth.

In testimony whereof I have hereunto set my signature in the presence of two subscribing witnesses.

THOMAS J. HELLER.

Witnesses:
  J. S. DOWNS,
  JOHN MCNEAL, Jr.